(12) United States Patent
Fehrenbacher et al.

(10) Patent No.: US 6,423,972 B1
(45) Date of Patent: Jul. 23, 2002

(54) METHOD FOR DETERMINING NEUTRON SPECTRA AND DEVICE FOR CARRYING OUT THE METHOD

(75) Inventors: Georg Fehrenbacher; Eric Cordes, both of München; Markus Sprunck, Markt Schwaben; Wolfgang Wahl, Schliersee, all of (DE)

(73) Assignee: GSF - Forschungszentrum für Umwelt und Gesundheit GmbH, Oberschleissheim (DE)

( * ) Notice: Subject to any disclaimer, the term of this patent is extended or adjusted under 35 U.S.C. 154(b) by 0 days.

(21) Appl. No.: 09/435,841

(22) Filed: Nov. 8, 1999

Related U.S. Application Data (63) Continuation-in-part of application No. PCT/EP98/02732, filed on May 11, 1998.

(30) Foreign Application Priority Data

May 23, 1997 (DE) .......................................... 197 21 618

(51) Int. Cl.⁷ ................................................. G01T 3/08
(52) U.S. Cl. ............................. 250/370.05; 250/390.07
(58) Field of Search ........................ 250/390.7, 390.01, 250/390.03, 391, 370.05, 252.1, 383.09, 370.06

(56) References Cited

U.S. PATENT DOCUMENTS

| | | | |
|---|---|---|---|
| 4,383,179 A | | 5/1983 | Eisen et al. |
| 5,059,801 A | * | 10/1991 | Burgess .................. 250/370.14 |
| 5,083,028 A | * | 1/1992 | Decossas et al. ...... 250/390.03 |
| 5,142,153 A | | 8/1992 | Gomberg |
| 5,406,086 A | * | 4/1995 | Barthe et al. .......... 250/390.03 |
| 5,572,028 A | | 11/1996 | Moscovitch et al. |
| 5,726,453 A | * | 3/1998 | Lott et al. .............. 250/390.01 |

FOREIGN PATENT DOCUMENTS

| | | |
|---|---|---|
| GB | 1 014 682 | 12/1965 |
| WO | WO 95 30909 | 11/1995 |

* cited by examiner

*Primary Examiner*—Constantine Hannaher
*Assistant Examiner*—Albert Gagliardi
(74) *Attorney, Agent, or Firm*—Klaus J. Bach (57) ABSTRACT

In a method and apparatus for determining neutron spectra using at least two neutron detectors which provide integral counting rates from which the spectrum of a neutron radiation can be approximated, and which consist each of a semiconductor diode, a converter layer, an inactive layer and an active layer. The various layers of each detector are different from those of the other neutron detector and so selected that the sensitivity functions of the two neutron detectors are different. An artificial neutral network is provided which is especially trained and to which the counting rates of the detectors are supplied to be processed for obtaining the neutron spectrum.

5 Claims, 6 Drawing Sheets

METHOD FOR DETERMINING NEUTRON SPECTRA AND DEVICE FOR CARRYING OUT THE METHOD

This is a continuation-in-part application of pending international application PCT/EP98/02732 filed May 11, 1998 and claiming the priority of German application 197 21 618.8 filed May 23, 1997.

BACKGROUND OF THE INVENTION

The invention relates to a method of determining neutron spectra utilizing two neutron detectors with different sensitivity functions wherein the counting rates of the two detectors are integrated and the spectrum is determined therefrom and to a device for performing the method.

Such a method is known from J.Barthe et al., "Radiation Protection Dosimetry", Vol. 70, Nos. 1–4, 59–66, (1997) Nuclear Technology Publishing.

For the measurement of the of neutron radiation doses mainly passive detection systems are utilized. These systems, however, are able to determine the doses sufficiently accurately only for limited energy ranges of the neutron radiation (for example, Albedo- or plastic trace detectors). In addition, these systems are analyzed only once per month so that an excessive radiation exposure is detected in some cases only after several months. It would be a large advance in personnal dosimetry detection of neutron radiation exposure if a real-time dose could be determined for an energy range covering thermal neutrons, that is, from the meV area to about 20 MeV without the need for workplace—specific calibration and correction factors. Most of the neutron fields, which normally occur (nuclear power plants, processing and transport of nuclear fuel, neutron therapy, etc.) have neutron energies in this range.

Personal dosimeters are used at present mainly in the field of photon detection. Examples of electronic personal dosimeters for photon radiation are: A personal dosimeter developed by Siemens-Plessey (EDPI, see for example, "Electronic Dosimetry, 1/93 issue 1, Siemens Plessey Controls Ltd, 1933) for the representation of the new measurement value Hp (10) for photon radiation and for the detection and dosimetry of photon and electron radiation with small penetration ranges (skin dose), or the dosimeter of the company Rados (RAD-50, RAD-52, digital pocket dosimeters, data sheets of Rados Technology, Oy, Finland) which, like the Siemens dosimeter are based on Si diodes.

There are presently only few active personal dosimeters on the basis of silicon. Examples are the neutron dosimeters of the Japanese firm Aloka (Barthe, Bordy, Lahaye; Electronic Neutron Dosimeters: History and State of the Art, Radiation Protection Dosimetry, Vol. 70, Nos. 1–4, 59–66 (1997)). They are designed for the detection of thermal and fast neutrons (Model PDM-303, see data sheet ALOKA CO. LTD Tokyo Japan) or exclusively for thermal neutrons (model PDM-307, see data sheet). The systems of the firm Stephen, which are based on counter tubes are suitable to detect photon radiation and to perform a dosis evaluation (data sheet Stephen, Centronic D.C.A. Mini Instruments T.G.M.; Surrey England).

Neutron detection systems for determining information concerning the energy distribution of neutron radiation over the radiation protection energy range of 10 meV to about 10 MeV, are known so far only in the form of the "Bonner Kugel" (Bonner spheres), which are based on the different absorption of the neutrons of each detection unit. (Bramblett H, Ewing, Bonner; A New type of Neutron Spectrometer; Nuclear Instruments and Methods 9, 1–12 (1980)). In an evaluation procedure, an experienced expert subsequently performs a so-called development in order to determine the neutron spectrum.

All the systems mentioned are so designed that they operate as occurrence counters without performing a radiation field analysis with the possibility of a spectrum determination. The Aloka dosimeter (PDM-303) was subjected to tests in order to determine the accuracy of a dose indication as a function of the neutron energy (for example CERN Report TIS-RP/TM/92–90 rev.(1992)). A result of the tests indicates a large deviation of the dose indication in comparison with the actual dose.

Of all these systems not a single one is suitable to represent, that is, to depict the neutron spectrum.

The only presently available system for neutron spectrometry covering the full energy range from thermal up to fast—that is the Bonner sphere system, is very expensive and involved since the detection units are very large and difficult to transport. Furthermore, they can be evaluated only by an experienced expert employing assumptions and information concerning the spectra measured. U.S. Pat. No. 5,572,028 discloses a detector system employing thermoluminescence detectors wherein dose values or energies are determined from the detector signals using artificial neural networks. The sensitivity functions of the various detectors are influenced in this case only by the use of various filters.

Furthermore, GB 1 014 682 discloses a method for determining neutron spectra wherein the energy spectrum is determined from the spectra measured by several threshold value detectors using a simple development procedure. This method however is limited to the energy ranges of 0.4 to maximally 3 MeV because of the type of threshold value detectors employed.

It is the object of the present invention to provide a method of the type described above, wherein, however, the neutron spectrum can be determined in real time and also to provide an apparatus for carrying out the method.

SUMMARY OF THE INVENTION

In a method and apparatus for determining neutron spectra using at least two neutron detectors which provide integral counting rates from which the spectrum of a neutron radiation can be approximated, and which consist each of a semiconductor diode, a converter layer, an inactive layer and an active layer. The various layers of each detector are different from those of the other neutron detector and so selected that the sensitivity functions of the two neutron detectors are different. An artificial neutral network is provided which is especially trained and to which the counting rates of the detectors are supplied to be processed for obtaining the neutron spectrum.

With the method according to the invention, wherein the dosis determination for neutron radiation is based on semiconductor detectors, an instant evaluation (real time dosimeter) is facilitated. The dosimeter consists of a multielement system for the recording of signals and a corresponding evaluation algorithm based on the concept of artificial neural networks, wherein no preliminary information concerning the spectral energy distribution of the neutron radiation is needed.

In contrast to prior art measuring systems, the energy distribution of the neutron radiation is now determined in a first step and the measurement value is calculated in a second step. This has the advantage that, with the use of appropriate dose conversion factors, various dose values, for example, body and organ dose values can be provided which, in the case of excessive exposures, are important for contributory values for determining an appropriate exposure value.

A radiation sensor includes a semiconductor having a converter associated therewith. Such a radiation sensor can be considered as an element. Or, if the particles are registered by way of the recorded pulse level distribution, the energy deposition occuring in a sensor for a particular energy range can be considered to be the element. In the method, the incident neutron spectrum is correlated with the ratios of the recorded counter incidents of the particular elements since each element has an individual energy dependency of the recorded counter incidents of the incident neutron radiation. The evaluation algorithm provides in the first step the neutron spectrum with a suitable energy distribution and, in additional steps, measured dose values are determined which are present in the evaluation software in the form of tables and which are therefore easily adapted (for example, the personal dose Hp(10), effective dose).

The method presented herewith simplifies the measuring and evaluation procedure as it permits an immediate development after a certain counting period. Based on the retained information concerning the energy of the neutron radiation field, various dose measurement values can be determined which permit the formation of a single measurement value. In addition, a new measurement value may eventually be introduced by a simple adaptation of the evaluation software. For the detection systems used at the present time, the hardware would have to be changed in order to permit the introduction of a new measurement value.

The novelty of the invention resides in the determination of the spectral distribution of the neutron radiation (possibly in large energy intervals) since all the dose measurement values can be derived from the spectral distribution (taking also in consideration the incident angle with respect to the person exposed). The evaluation of the neutron radiation can be relatively easily modified to accommodate the introduction of a new measurement value (as it presently happens with the new ICRV measurement value by appropriate adaptation of the dose conversion factors in the evaluation algorithm.

It is therefore no longer necessary to adapt, that is to change, the detection hardware. It is also possible to indicate body and oxygen doses as it has been proposed by the radiation protection rules.

In summary, the properties and advantages of the invention are as follows:

Determination of the spectral information and the dose (for example, Hp(10)).

The use of a multi-element system (1) for receiving data: an element is defined herein by a variation of its output signal depending on the spectral make-up of the neutron field.

For the analysis of the input data, an artificial neural network (2) is utilized. This calculation method requires no setup information with respect to the type of radiation source (reactor, transport container, source, etc.). The system can be adapted to requirement changes simply by changing the software (not parameters).

The dose or, respectively, the dose spectrum is calculated by easily exchangeable dose conversion functions.

The system permits a time dependent measurement value determination. The measurement values can be indicated also during the measurement procedure (direct indication).

Since the system utilizes several elements for the data recording a dose indication is still possible if one or several elements are omitted.

Below, the invention will be described on the basis of two embodiments in connection with the accompanying drawings.

DESCRIPTION OF PREFERRED EMBODIMENTS

Figure 1:
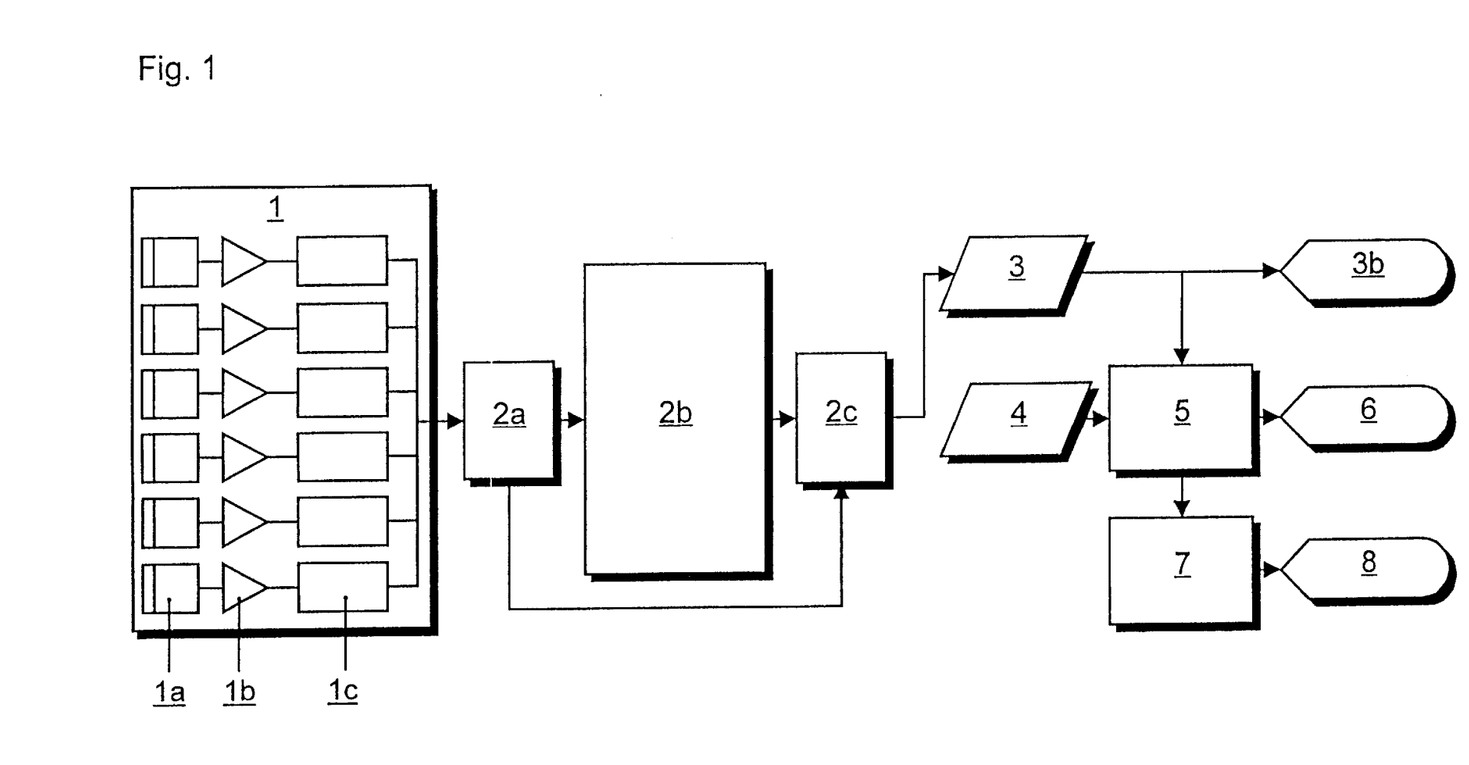
FIG. 1 shows a flow sheet for the functions of the method according to the invention.

In the flow scheme of FIG. 1, the essential functional groups and processing steps of an embodiment for the dosimetry system according to the invention are presented. The individual components are numbered and will be described below in greater detail. In addition, the measurement and analysis process is illustrated as an example on the basis of two quite different neutron spectra in FIGS. 3a,b,c and 4a,b,c. The information present at different processing times is also shown.

The Multi-Element System 1

Figure 2:
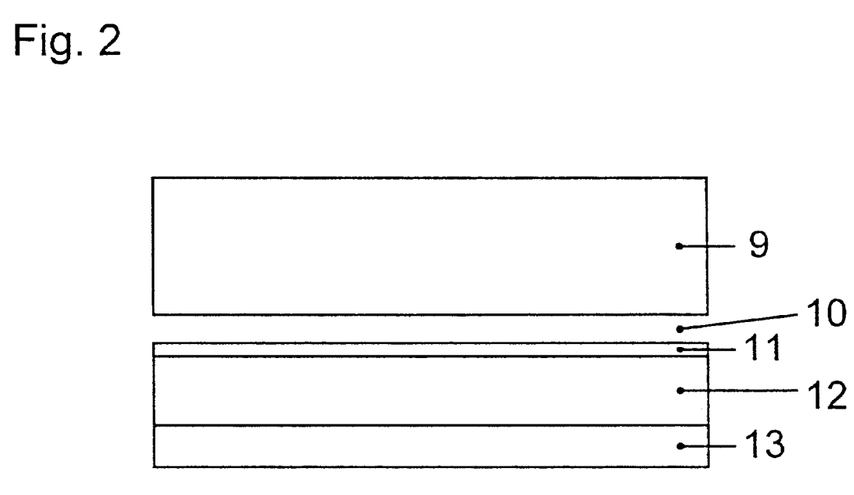
FIG. 2 shows schematically a neutron detector.

For the reception of the signals, an arrangement of several elements is used whose output signals are different depending on the spectral distribution of the neutron field. Possible actual embodiments of elements are for example:

A combination of several integrally operated Si-diodes with different layer setups and different conversion materials for the conversion of the neutrons into charged particles (particularly suitable for small doses). Such an arrangement is shown in FIGS. 1, (1a, 1b, 1c). A possible design of the neutron sensor (FIGS. 1, 1a) is shown in FIG. 2.

The signals of the sensors are amplified by suitable amplifiers (FIGS. 1, 1b) and are then counted (FIGS. 1, 1c).

The various channels of a multi-channel analyzer, which analyzes the pulse level signals of an individual converter-covered diode (suitable for large doses with better resolution):

A combination of the two methods.

Figure 5:
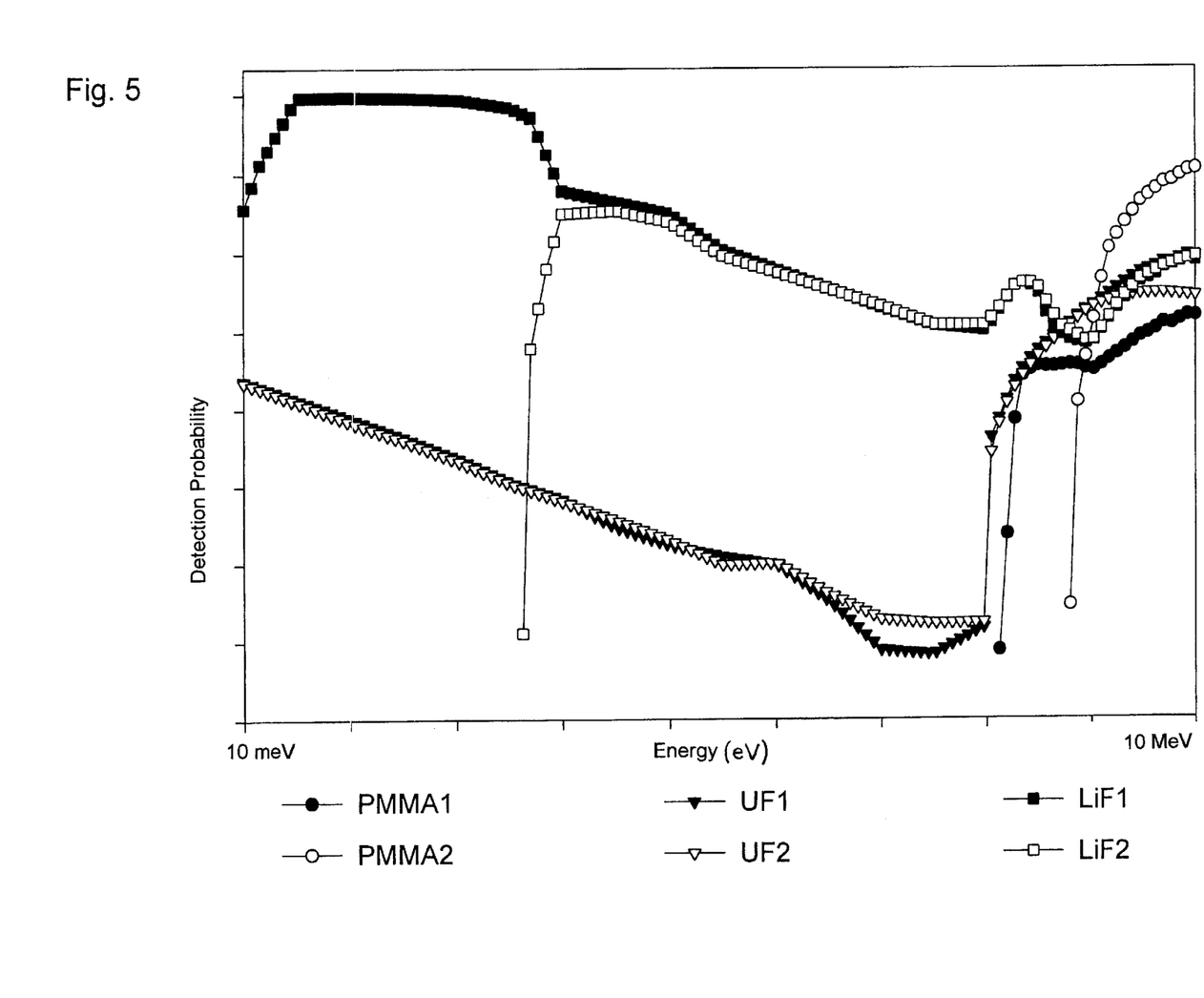
FIG. 5 shows the sensitivity functions of six neutron detectors.

In order to achieve a sufficiently accurate reconstruction of the spectrum by the neural network 2b, it is important to find a suitable combination of input signals (number of elements, design of the diodes as well as the combination and layer thickness of the converter). In order to select from the large number of possible combinations those which are reasonable and appropriate, software for the simulation of the neutron sensitivity functions of the individual diodes was developed and verified by comparison with actual measurements (FIG. 5).

As a result of these examinations for the application example presented herein, the following arrangement of six Si diodes in combination with the converter materials as indicated and the given layer thicknesses was utilized. The converter layer was disposed directly in front of the diode. The parameters are assembled in the following table.

TABLE I

The converter materials used for the embodiment and their layer thicknesses as well as the inactive layer thickness and the thickness of the active layer of the Si diodes.

| Sensor | Convertor | Convertor Thickness | Inactive Layer | Active Layer |
|---|---|---|---|---|
| S1 | PMMA I | 50 μm | 500 Å | 10 μm |
| S2 | PMMA II | 50 μm | 10 μm | 500 μm |
| S3 | UF I | 50 μm | 500 Å | 50 μm |
| S4 | UF II | 50 μm | 500 Å | 10 μm |
| S5 | $^6$LiF I | 50 μm | 500 Å | 50 μm |
| S6 | $^6$LiF II | 2 mm | 500 Å | 50 μm |

$^6$LiF: 6-liothium-fluoride (for example Harshaw-Bicron TLD-600)
UF: urea formaldehyde
PMMA: polymethylmethacrylate The artificial Neural Net 2a, 2b, 2c The computation of a spectral information consisting of six energy intervals (energy groups) from the six measured signals is achieved by means of an artificial neural network. The following three computation steps are necessary:

2a: The scaling of the counting rates in order to separate from the signals a factor, which depends only from the dose. With the scaling all the counting rates are divided by the highest counting rate that is, after scaling, all counting rates are disposed in a value range between zero and one. The separated factor is stored for the reverse scaling. (FIG. 1, 2c).

2b: The signal is analyzed using a suitable artificial neural network. The neural network used herein is a so-called feed-forward network with two covered layers. All neurons of the network have a non-linear transmission function (hyperbolic tangent). The output range of these neurons is between −1.0 and +1.0. Any layer has connections only with the previous and the following layer. There is no connection that jumps a layer. For the input layers 6 input nodes were selected corresponding to the input elements: for the first covered layer 16 neurons for the second covered layer 10 neurons and for the final layer 6 neurons. The neurons of the final layer correspond to the same number of energy intervals of the reconstructed spectrum. The limits of the energy intervals were determined using a linear $x^2$ optimization procedure under the condition to minimize the deviation of the doses as determined from the original spectrum from the doses determined from the approximated spectrum. Subsequently, the weights (connection strengths) of the network are trained by means of the two learn algorithms "Simulated annealing" and "back propagation". The normal output signals required for the training and the testing of the network can be determined by measurements and by simulation of the sensors, wherein, depending on the type of the spectra employed (in this case 392), the network topology varies clearly. After the training step the network remains unchanged and can be used for the computation of unknown spectra without the need for a large computation effort.

2c: With the rescaling the absolute dose information is again added in by multiplication of all 6 output channels with the factor stored during scaling.

The artificial neural network used for the analysis of the measuring data can be realized either as software in connection with a micro control computer or as a hardware solution for example using a suitable ASIC device. As the artificial neural network, it is necessary to use a network topology adapted to the task, an appropriate reproduction procedure and a suitable training method. The network topology describes the number of neurons in the network, their arrangement and transmission behavior as well as the properties of the connections among the individual neurons. The reproduction procedure describes the order of the operational computation steps from the application of the input data until the computed results are present.

The use of a suitable training procedure or a combination of several procedures has a significant influence on the quality of the generalization capability in the reproduction of the completed trained network. The likelihood of excessive training of the network, that is, full copying of the training sample can be reduced by using a validation amount. The artificial neural network is trained using known neutron spectra, which are divided, by chance, into a training amount (ca. 80%) and a validation amount (ca. 20%). The optimizing procedure uses only the training amount of the neural network error and uses the validation amount only for the determination of a suitable point in time for interrupting the minimizing process. The learn success is checked by way of the error of the validation amount by considering the statistical deviation of the spectra determined by the artificial neural network from counting rates of the input elements from the real spectra. When the validation error reaches a minimum, the network is optimally trained. During training the counting rates of the input elements and the corresponding neutron spectra are available to the neural network. During various optimization runs the artificial neural network learns the coordination of "counting rates of the input elements", and the "approximation of the neutron spectrum". This relation is stored in the various weights of the connections between the neurons. In order to improve the capability of the artificial neural network to generalize, additional versions of the spectra with different fuzziness are presented to the neural network during training. By an appropriate combination of the learn volume the artificial network can be optimized for different purposes. For example, the network may be trained selectively for a universal use such as the determination of the spectral information of unknown radiation fields over a large energy range or it may be trained for a specialized task such as an accurate determination of the spectral information in a predetermined radiation situation and/or a limited energy range.

For the use of the network, the weights must not be changed after training. The weights of the network connections which are the result of the training process, are recorded in a re-writeable storage device (for example, EE PROM) and therefore, can be changed if necessary and adapted to a particular situation. As answer to the integral counting rates of the input elements adjoining the neurons of the input layer, the output neurons of the trained network assume, upon reproduction, a number value which is proportional to the number of neutrons in a certain energy interval. Since the artificial neural network can process in a certain time interval only input and output values in accordance with the selected transfer function, it is pointed out here, that the integral counting rates serving as input values are appropriately scaled before being transmitted to the artificial neural network and the output values are correspondingly re-scaled.

Spectral Information 3

As the result of the analysis of the input data by the artificial neural network, the spectral information is provided in the exemplary embodiment in the form of 6 values for the neutron flow for the 6 energy intervals (energy groups). This can then, on one hand, be directly indicated (FIG. 1, 3b) and permit instant conclusions concerning the radiation field and, on the other hand, these data are further processed in an additional processing step (FIG. 1, 5).

Dose Conversion Factor 4

Figure 4A:
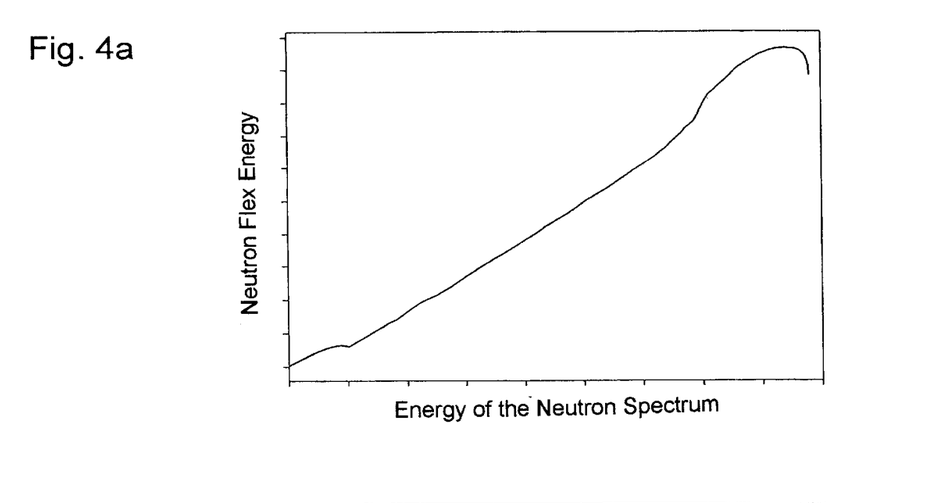

The energy dose and the biological effectiveness of neutrons of different energy varies over the energy range from thermal up to fast neutrons to a large degree. In order to take this fact into consideration, weighting functions (dose conversion factor curves) are used which are different depending on the dose value (H*(10), Hp(10) MADE, etc) gender (Adam, Eve) or certain organ doses (FIG. 4). Furthermore, the dose conversion factors are subject to constant change because of the constantly changing state of the art (for example, the valuation of the biological effectiveness). In this system, changing weighting functions are implemented by software changes (FIGS. 1, 4), which is a simple and inexpensive procedure and requires no hardware changes.

Combining of the Spectral Information with the Dose Conversion Factors 5

At this point, the conditions described under 4 are taken into consideration in that the spectral information present (FIGS. 1, 3) is combined with the desired dose conversion factor curve (FIGS. 1, 4). The result is a dose spectrum (FIGS. 1, 6).

The Dose Spectrum 6

In the dose spectrum (FIGS. 1, 6), the respective contribution to the total dose is depicted for each of the six energy ranges (energy groups) in the form of a partial dose value. This information can also be indicated and therefore may be helpful in the selection of suitable shielding measures.

Integration Over the Dose Spectrum 7

By a final integration (FIGS. 1, 7) over the dose spectrum a suitable dose measurement value (H*(10), Hp(10) MADE etc) is determined and directly indicated (FIGS. 1, 8).

Dose Value 8

At the end of the analysis chain, a dose value is provided (FIGS. 1, 8), which can then be used like with prior dosimeters. As already mentioned in par. 4, the dose measurement value to be determined can be adapted to varying requirements by an exchange of the dose conversion factors. On the other hand, several dose conversion factors may be stored in the system so that an immediate retrieval of various dose measurement values is possible.

Alternative example of an application using four elements:

A large number of elements with very different patterns of the neutron response functions facilitates a clear determination of the neutron spectra by the artificial neural network. On the other hand, the number of input elements should be as small as possible to save expenses and to keep electricity consumption as small as possible. For this reason also, a system with only four sensors in place of the six sensor system described herein in detail has been examined. A system comprising converter-covered Si diodes achieved an acceptable approximation to the real input spectrum.

The parameters are listed in table 2:

TABLE 2

| Sensor No. | Convertor | Convertor Thickness | Inactive layer (Si) | Active Layer (Si) |
|---|---|---|---|---|
| S1 | PMMA I | 1 μm | 500 A | 10 μm |
| S2 | PMMA II | 1 μm | 10 μm | 500 μm |
| S3 | UF | 20 μm | 500 A | 10 μm |
| S4 | ⁶LiF | 50 μm | 500 A | 50 μm |

However, since the time requirements for an optimization of the sensors increases substantially with a reduction in the number of input data, further examinations were postponed at this point. It can be said however, that, specifically but not necessarily, by a restriction to certain neutron energy ranges and/or spectra classes, the number of sensors can realistically be reduced down to three. Even a two-sensor system may provide information concerning the contributions of thermal and fast neutrons.

The separation of the pulse level spectrum into energy partial ranges provides additional information for the artificial neural network. In this case, for example, the fact that kinematic effects in the interaction of fast neutrons and detector materials results in significant changes in the pulse level distribution or that during exothermic reactions with thermal neutrons the maximum energy of the reaction products is well defined can be used. Examples are:

With hydrogen containing converters—assuming a complete slowdown in the active layer—the fact can be utilized that the maximum energy deposition in the active layer is directly proportional to the maximum energy of the neutrons. If suitable threshold values are given, more information with regard to fast neutrons with energies under or above the respective threshold values can be obtained.

The setting of an energy threshold at 2.7 MeV with a $^6$LiF covered sensor. In this case, only fast neutrons contribute to the counting rate above the threshold; below the threshold thermal as well as fast neutrons are detected. Because of the higher effective cross-section for the reactions with thermal neutrons the thermal neutrons dominate the counting rate.

Description Concerning FIG. 2

Detection principle.

The neutrons are detected by way of the interaction of the incident neutrons with the cores of the neutron detection layers in which charged particles are generated which produce a signal in the active layer of the detector by energy deposition. The construction of the detector can by characterized by four layers:

Converter Layer 9

The interaction of the incident neutrons occurs mainly in this layer. It determines the properties of the detector by the respective selection of the materials and the layer thicknesses. Important in this connection is the detection probability of the neutrons as a function of their incident energy. The layer thicknesses: From 10 μ for exothermic converters for the detection of slow and thermal neutrons up to several mm for the detection of fast neutrons. A detailed description of the converter materials to be considered for the various energy ranges is provided later under the heading "Selection of suitable converter materials".

Inactive Layer 10, 11

Because of the sensitivity of diodes with respect to surface contamination and light the diodes are provided with a passivation coating (FIGS. 2, 11), which reduces the effects mentioned. This however has the disadvantage that the ions, which travel from the converter into the detector, can be slowed down in this layer. Consequently, the function of the detection probability can be influenced. The thickness of the inactive layer: Ideally it should be as thin as possible for the detection of low energy particles; practically from 500 Angstrom to several 10 μ for use as a threshold value sensor. The gap between the converter and the diode which is often unavoidable (FIG. 2, 10) is added in this case to the inactive layer.

Active Layer 12

This layer serves for the detection of charged particles which are generated by the neutron interaction. Assuming that neutron and photon occurrences can be separated (for example, by pulse form analysis, coincidence techniques or ΔE/E—techniques), the active layer can have similar layer thicknesses as the converter layer (several 100 μm up to mm), so that the interactions experienced by the neutrons in the active layer contribute significantly to the detection probability. Layer thickness:—Generally active layers of small thickness are selected in order to keep the sensitivity to photons small, typically about 50 μ.

Passive Layer 13 Behind the Active Zone 12

This layer results in an eventual reflection of the ions. With a detector, which is attached to a phantom, the reflected neutron radiation can interact in this layer whereby this layer serves as a neutron converter.

Possibilities of influencing the sensitivity functions:

with a variation of the parameters of these layers the sensitivity functions (FIG. 5) of the sensors may be very different. Therefore the requirement can be fulfilled that the sensors must be able to detect over the full energy range of the neutron spectrum and that they have different sensitivity functions with increased detection probabilities in certain energy ranges. The pattern of the sensitivity functions set by the optimization determines the realization possibilities or, respectively, the quality of the development by the artificial neural network. The optimization was performed in accordance with the following two principles:

1. Principle of the Threshold Value Sensors

This sensor is so designed that neutrons above a certain energy are detected. This can be achieved by the following methods:

a) Of the measured pulse level distribution occurrences are utilized which correspond to energy depositions greater than a particular threshold value.

b) The inactive layer between the neutron converter and the active zone has a layer thickness so selected that ions have a certain non-disappearing probability, to reach the active detector layer only if they have a certain energy upon leaving the converter.

c) The converter is so designed that moderation and absorption effects occur.

d) The combination of the methods a, b, and c.

2. The Principle of the Complementary Sensors (Considering Two Sensors at a Time)

With these sensor-types, the following concept is followed: Two sensors are identical in their design except for one layer (for example, the active layer). For sensors which register slow and thermal neutrons, the detection probability curves extend over many value orders of the energy of the neutrons in the same way. Only in the range of the fast neutrons, they have different values (for example, VF1, VF2). Such a sensor pair provided in this example information concerning the spectral part of fast neutrons. Sensors for the detection of slower and thermal neutrons, which have different converter layer thicknesses such that one sensor has absorption effects with thermal neutrons, while both sensors have similar detection probabilities for fast neutrons, provide information concerning the spectral distributions in the thermal range (for example LiF1, LiF2).

Selection of Suitable Converter Materials

The converter has the purpose to generate from the neutrons, which interact very little with matter, particles which can easily be detected. This may be achieved either by an elastic impulse or by a nuclear reaction. It is important in this connection that the effective cross-section for the respective reaction is large in the relevant energy range in order to effectively detect the neutrons. On the other hand, the charged particles generated (ions) should have a sufficiently high energy to provide a signal which is greater than the background static of the detectors. For the various energy ranges of the incident radiation different converters should be considered.

Neutrons of low and medium energy (thermal and intermediate neutrons):
Energy range: MeV–KeV
Detection by exothermal nuclear reaction (Example: $^6$Li (n, T) $^4$He, $^{10}$B(n, α) $^7$Li, $^{14}$N(n,p) $^{14}$C)
Examples: $^6$Li: $^6$Li F-Crystal, $^{10}$B: $^{10}$B-foil; $^{14}$N; air gap, nylon.

High energy neutrons (fast neutrons):
Energy range: >1 MeV
Detection by elastic impulses with bonded protons highly hydrogen containing compounds (n,P). Although collisions with other elements may occur, the collision with protein is of outstanding importance since, because of the almost same mass of the collision particles, there is a maximal energy transfer to the charged particle. In addition, the likelihood that the heavier collision partner reaches the active range of the detector is greatly reduced because of the substantially greater slow down capability or respectively, with regard to protons, the smaller travel distance resulting therefrom.

Examples PMMA, paraffin and other artificial resins of high hydrogen content.

High energy neutrons (fast neutrons):
energy range: >7 MeV.
Detection by way of elastic impulses and nuclear reactions, particularly with the Si of the diodes themselves (example: Si(n,α) from about 2.65 MeV, Si(n,p) from about 3,8 MeV, Si(n,n'α) from about 10 MeV, Si(n, n'p) from about 12 MeV).

With neutron energies above about 7 MeV nuclear reactions become more important because their effective cross-sections increase substantially in this energy range.

Figure 3A:
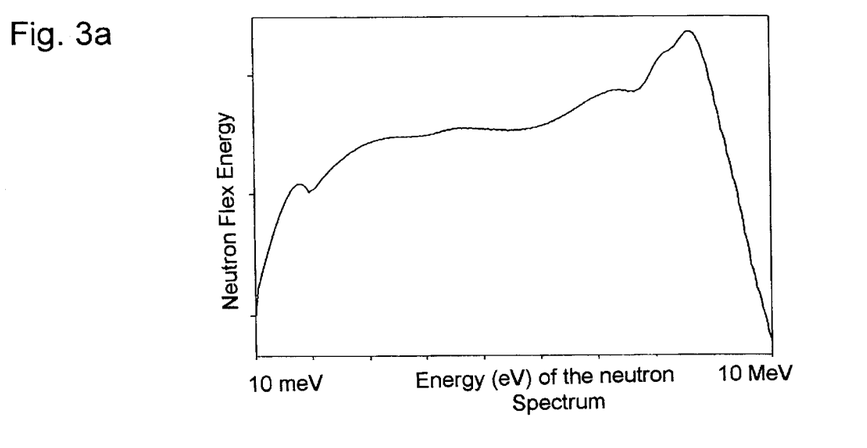
FIGS. 3a, 3b, 3c and 4a, 4b, 4c show neutron spectra with the respective individual counting rates and the calculated neutron flux energy.
Figure 3B:
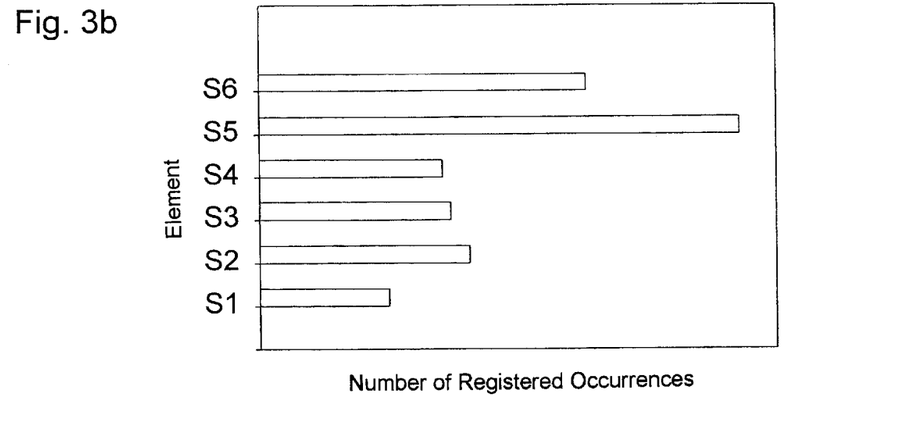
Figure 3C:
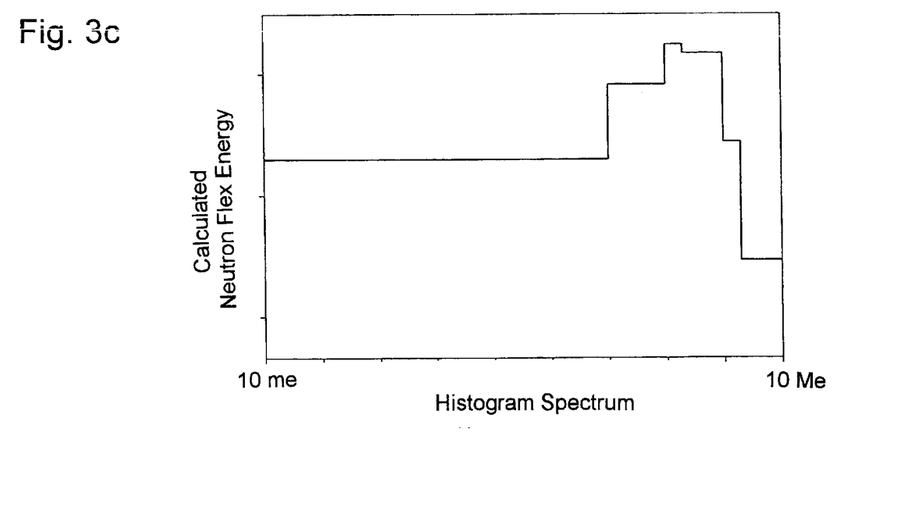
Figure 4B:
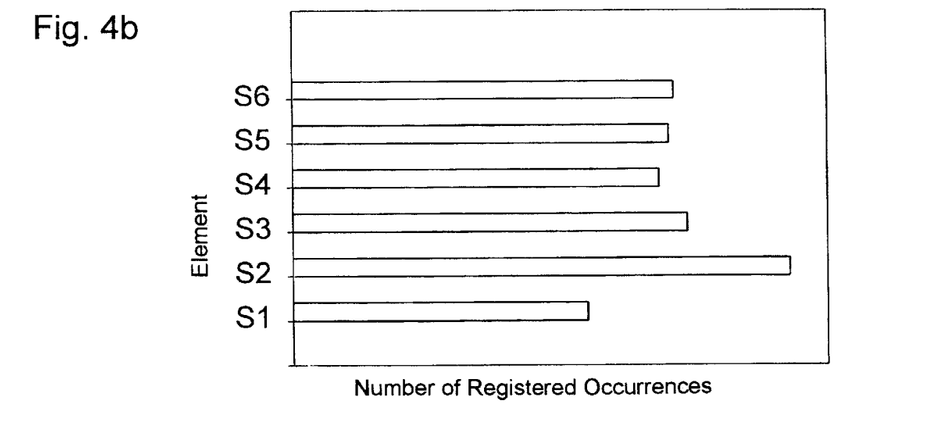
Figure 4C:
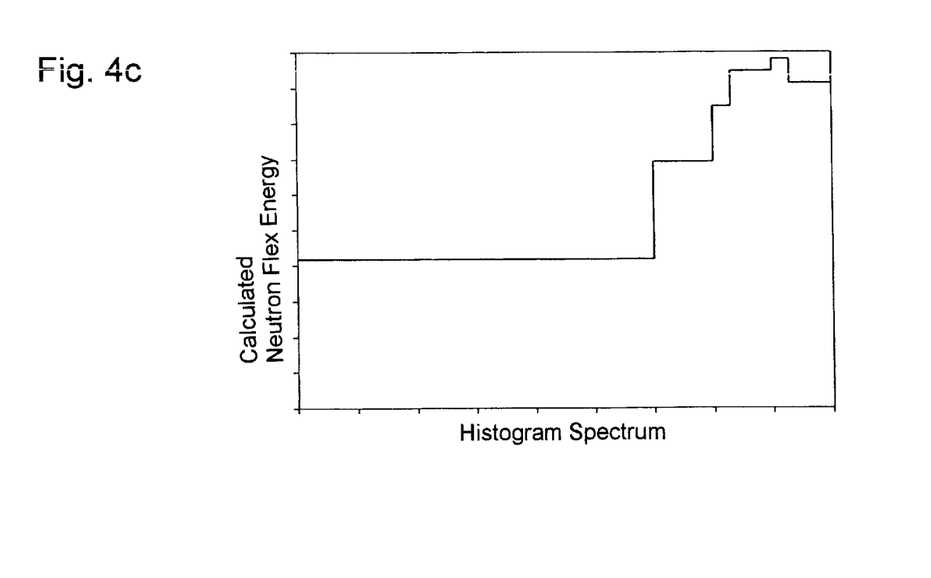

Description Concerning FIGS. 3a and 4a a) Representation of the incident neutron spectrum—basis: energy in eV, Range: 10 meV to 10 MeV; Ordinate: neutron flux energy in the energy range of 10 meV to 10 MeV. FIGS. 3a, shows a reactor fission spectrum with a large percentage of thermal neutrons (shield), FIG. 4a shows a spectrum which is dominated by fast neutrons (no shield).

b) FIGS. 3b and 4b show the absolute counting values of the six elements. Base: integral counting rate in any unit; ordinate: identification number of the element. The numbering of the elements (S1–S6) corresponds to that of table 1; the number of occurrences is depicted horizontally on a logarithmic scale. For the further processing by the artificial neural network, the counts of the six elements are normalized on a logarithmic scale to the value range of 0 to 1, and the respective normalization factor is stored.

c) FIGS. 3c and 4c show a histogram spectrum. Base: energy in eV, range: 10 me to 10 Me; ordinate: neutron flux energy in any unit. The output values of the six output neuron of the artificial neural network vary between −1 and 1. By resealing with the stored normalization factor, the histogram spectrum is determined therefrom.

Description Concerning FIG. 5

The sensitivity functions of the six sensors. Base: energy range: 10 meV to 10 MeV; ordinate: detection probability in any unit.

The representation of the sensitivity functions of the six sensors given in the example: The sensors PMMA 1 and PMMA 2 indicate the threshold value sensor principle; the LiF1 and LiF2 or, respectively, UF1 and UF2 sensors on the other hand indicate the complimentary sensor principle.

Figure 6:
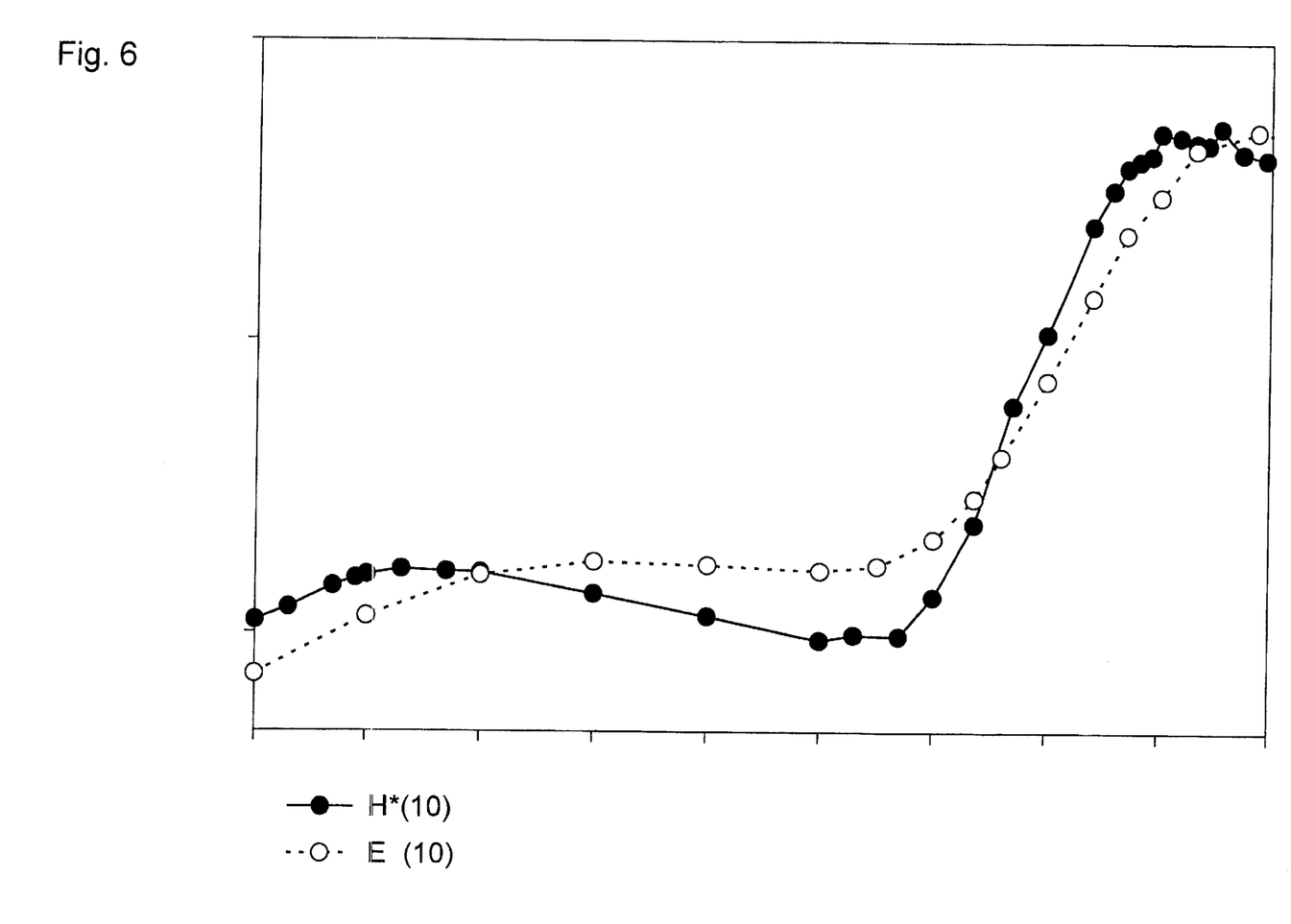
FIG. 6 shows two dose conversion factor curves.

Description Concerning FIG. 6

Example for dose conversion factor curves. Base: Energy in eV, range 10 meV to 10 MeV; ordinate; conversion factor in pSv cm$^2$, range (scale points): 10 to 1000.

Comparison of the dose conversion factor curves for two different dose measurement values (H*(10), E(10)). Particularly in the range with a strong change of the conversion factor, a good reproduction of the neutron spectrum by the artificial neural network is important.

What is claimed is:

1. An apparatus for determining neutron spectra comprising at least three semiconductor detectors each having at least a converter layer of a selected thickness and including a compound comprising at least one of the group consisting of Lithium, Boron and Nitrogen providing for an interaction with incident neutrons to thereby generate charged particles, an active layer disposed below said converter layer for detecting charged particles generated by said interaction of said incident neutrons with said converter layer, and an inactive layer disposed between said converter layer and said active layer for protecting said active layer from light and contamination and for slowing down ions generated in said converter layer, said at least three semiconductor detectors having different layer thicknesses depending on the neutron spectrum to be detected by a particular detector, one of said detectors having in said converter layer a larger amount of hydrogen-containing compounds than the other detectors for the detection of high energy neutrons.

2. An apparatus according to claim 1, wherein said detectors have converter layers including different ones of said compounds for the detection of different neutron spectra.

3. An apparatus according to claim 1, wherein said layer thicknesses are selected depending on the neutron spectrum to be detected by a particular detector for the adjustment of the particular sensors sensitivity functions.

4. An apparatus according to claim 1, wherein another inactive layer is provided at the side of said active layer opposite said converter layer for the reflection of ions back into said active layer.

5. An apparatus according to claim 1, wherein a power supply is provided for said detectors and an electronic evaluation unit with a neutral network receiving, as inputs, counting rates of said at least three detectors, said neural network being trained to provide outputs indicating neutron spectra of various energy ranges depending on the sensor values provided by said at least three detectors.

* * * * *